(12) United States Patent
Ammi et al.

(10) Patent No.: US 11,343,194 B1
(45) Date of Patent: May 24, 2022

(54) COMMUNICATION DEVICE AND DATA COLLECTION SYSTEM

(71) Applicant: Mitsubishi Electric Corporation, Tokyo (JP)

(72) Inventors: Daisuke Ammi, Tokyo (JP); Tsuguya Oishi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/605,232

(22) PCT Filed: Jul. 5, 2019

(86) PCT No.: PCT/JP2019/026795
§ 371 (c)(1),
(2) Date: Oct. 21, 2021

(87) PCT Pub. No.: WO2021/005636
PCT Pub. Date: Jan. 14, 2021

(51) Int. Cl.
*H04L 47/25* (2022.01)
*H04L 47/628* (2022.01)

(52) U.S. Cl.
CPC ............ *H04L 47/25* (2013.01); *H04L 47/628* (2013.01)

(58) Field of Classification Search
None
See application file for complete search history.

(56) References Cited

U.S. PATENT DOCUMENTS

2011/0179342 A1\* 7/2011 Kim .................... H04L 43/0817 714/E11.032
2012/0022815 A1 1/2012 Murakami et al.
(Continued)

FOREIGN PATENT DOCUMENTS

JP 9-219715 A 8/1997
JP 2006-325138 A 11/2006
(Continued)

OTHER PUBLICATIONS

International Search Report and Written Opinion dated Aug. 20, 2019, received for PCT Application PCT/JP2019/026795, Filed on Jul. 5, 2019, 9 pages including English Translation.
(Continued)

*Primary Examiner* — Anh Ngoc M Nguyen
(74) *Attorney, Agent, or Firm* — Xsensus LLP (57) ABSTRACT

A communication device and a data collection system that, when lower connection devices are connected to a communication device, improve efficiency of communication between the communication device and an upper connection device. There is an acquirer that acquires data from the lower connection devices, and a transmission setter that sets a transmission period, which is a time interval in which the data acquired by the acquirer from the lower connection devices is compiled and the compiled data is transmitted to the upper connection device as transmission data, to be equal to or longer than a communication period that is the longest among communication periods of the lower connection devices. Further, there is a transmitter that transmits the transmission data to the upper connection device with the transmission period that is set by the transmission setter.

7 Claims, 8 Drawing Sheets

(56) References Cited

U.S. PATENT DOCUMENTS

| | | | |
|---|---|---|---|
| 2012/0056710 A1* | 3/2012 | Zhu | G06K 19/0717 340/3.1 |
| 2012/0254350 A1 | 10/2012 | Ito et al. | |
| 2013/0318260 A1 | 11/2013 | Watabe | |
| 2017/0147425 A1* | 5/2017 | Waheed | G06F 11/2094 |
| 2017/0246741 A1 | 8/2017 | Kobayashi et al. | |

FOREIGN PATENT DOCUMENTS

| | | | |
|---|---|---|---|
| JP | 2011-158990 A | 8/2011 |
| JP | 2011-197838 A | 10/2011 |
| JP | 2012-205278 A | 10/2012 |
| JP | 2014-85804 A | 5/2014 |
| JP | 2017-158417 A | 9/2017 |
| WO | 2011/089678 A1 | 7/2011 |
| WO | 2012/111653 A1 | 8/2012 |

OTHER PUBLICATIONS

Notice of Reasons for Refusal dated Feb. 25, 2020, received for JP Application 2019-572256, 8 pages including English Translation.
Decision to Grant dated Jun. 9, 2020, received for JP Application 2019-572256, 5 pages including English Translation.

\* cited by examiner

| DEVICE | IDENTIFICATION INFORMATION | COMMUNICATION PERIOD (MS) | DATA SIZE (BYTE) |
|---|---|---|---|
| UPPER CONNECTION DEVICE 300 | name_m | 400 | 50 |
| LOWER CONNECTION DEVICE 100a | name_a | 100 | 4 |
| LOWER CONNECTION DEVICE 100b | name_b | 200 | 7 |
| LOWER CONNECTION DEVICE 100c | name_c | 400 | 10 |

FIG. 4

| DEVICE | HOLDING-DATA SIZE (BYTE) |
|---|---|
| LOWER CONNECTION DEVICE a | 16 |
| LOWER CONNECTION DEVICE b | 14 |
| LOWER CONNECTION DEVICE c | 10 |

FIG. 5

| DEVICE | TRANSMISSION-DATA SIZE (BYTE) |
|---|---|
| LOWER CONNECTION DEVICE 100a | 18 |
| LOWER CONNECTION DEVICE 100b | 16 |
| LOWER CONNECTION DEVICE 100c | 12 |

| DATA OFFSET AMOUNT | DEVICE DATA SIZE | DATA SET NUMBER | OUTPUT DATA |
|---|---|---|---|

FIG. 8

COMMUNICATION DEVICE AND DATA COLLECTION SYSTEM

CROSS-REFERENCE TO RELATED APPLICATION

The present application is based on PCT filing PCT/JP2019/026795, filed Jul. 5, 2019, the entire contents of which are incorporated herein by reference.

TECHNICAL FIELD

The present disclosure relates to a communication device and a data collection system.

BACKGROUND ART

A data collection system is known that includes (i) a lower connection device that detects data about a target object and outputs the data, (ii) a communication device that acquires the data from the lower connection device and transmits the data to an upper connection device, and (iii) an upper connection device that receives the data from the communication device.

In a case in which, for example, the target object is a motor, the lower connection device is a sensor that detects data relating to this motor. Examples of this sensor include a vibration sensor that detects vibration of the motor, and an acceleration sensor that detects acceleration. In this case, the communication device is a device that acquires data from such a sensor, and the upper connection device is a device that calculates a malfunction probability of the motor from the data of the sensor that is received from the communication device and that, in a case of a high malfunction probability of the motor, causes notification by an alarm. Employing this configuration allows the data collection system to detect and send notification of the malfunction of the motor in advance.

A conventional communication device transmits data to the upper connection device at transmission periods that are regular time intervals. In a case where a communication period with which the lower connection device connected to the communication device communicates is longer than the transmission period, a situation occurs in which the communication device repeatedly transmits the same data from the lower connection device to the upper connection device. Patent Literature 1 discloses a technique for, by reducing such transmission of the same data, improving efficiency of communication between the upper connection device and the communication device.

According to Patent Literature 1, an upper connection device determines for each of communication devices whether data received therefrom is altered from previously-received data, and changes the transmission period for each communication device based on presence/absence of such alteration of data. Specifically, for a communication device for which alteration of data is not made, the transmission period is made to be longer than before, whereas for a communication device for which alteration of data is made, the transmission period is made to be shorter than before. This enables reduction in a frequency of transmission by the communication devices of the same data to the upper connection device. Since the upper connection device optimizes the transmission period of each communication device based on an update period with which data is updated by the communication device, the efficiency of communication between the upper connection device and the communication devices can be improved.

CITATION LIST

Patent Literature

Patent Literature 1: Unexamined Japanese Patent Application Publication No. H9-219715

SUMMARY OF INVENTION

Technical Problem

According to Patent Literature 1, the upper connection device determines whether the data from the communication device is updated. Thus, the update period with which the data acquired from the communication device by the upper connection device is updated is made to be equal to an update period of a lower connection device that updates data with the shortest update period. In a case in which the data of the lower connection device is updated with a communication period of the lower connection device, the communication period of the lower connection device is equal to the update period with which the data of the lower connection device is updated. Thus, when a configuration is employed in which multiple lower connection devices are connected to the communication device, to match the transmission of data of a lower connection device that communicates with a communication period that is the shortest among communication periods of the multiple lower connection devices, transmission of the same data of another lower connection device that communicates with a communication period that is longer than the shortest communication period is performed. This results in a problem of deterioration in the communication efficiency between the upper connection device and the communication device due to an increase in a number of transmissions of data per unit time from the communication device to the upper connection device. Further, the communication device unnecessarily performs repetitive transmission to the upper connection device of the same data, resulting in a problem of deterioration in the communication efficiency between the upper connection device and the communication device due to the unnecessary transmission of data.

The present disclosure is made to solve the aforementioned problems, and an objective of the present disclosure is to provide a communication device and a data collection system that, when lower connection devices are connected to the communication device, improve efficiency of communication between the communication device and an upper connection device.

Solution to Problem

A communication device according to the present disclosure includes (i) an acquirer to acquire data from lower connection devices, (ii) a transmission setter to set a transmission period, which is a time interval in which the data acquired by the acquirer from the lower connection devices is compiled and the compiled data is transmitted to an upper connection device as transmission data, to be equal to or longer than a communication period that is longest among communication periods of the lower connection devices, and (iii) a transmitter to transmit the transmission data to the upper connection device with the transmission period that is set by the transmission setter.

Advantageous Effects of Invention

According to the communication device and the data collection system according to the present disclosure, the transmission period with which the communication device compiles data acquired from the lower connection devices and transmits the compiled data to the upper connection device is set to be equal to or longer than a communication period that is the longest among the communication periods of the multiple lower connection devices. This enables reduction in a number of transmissions of data per unit time from the communication device to the upper connection device, thereby enabling improvement in efficiency of communication between the upper connection device and the communication device, and leads to avoidance of unnecessary repetitive transmission to the upper connection device of the same data, thereby enabling improvement in efficiency of communication between the upper connection device and the communication device.

DESCRIPTION OF EMBODIMENTS

Embodiment 1

Hereinafter, configuration according to Embodiment 1 of the present disclosure is described. In explanations of the drawings, components that are the same or equivalent are assigned the same reference sign, and duplicate explanation for such components is omitted.

Figure 1:
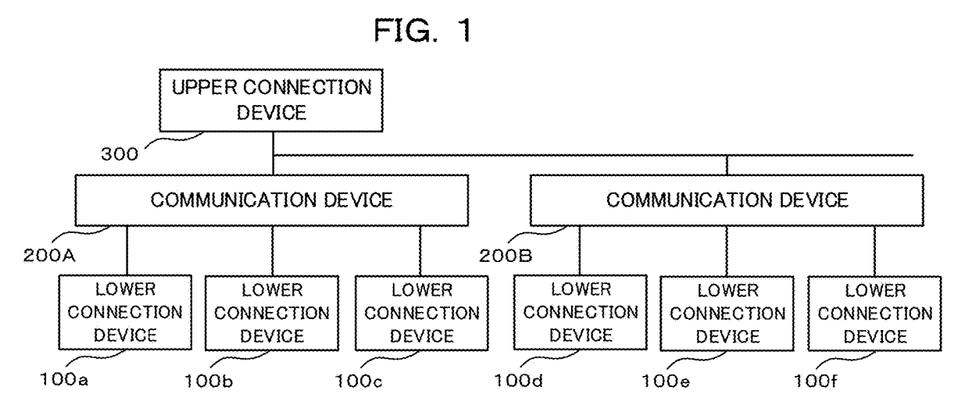
FIG. 1 illustrates configuration of a data collection system according to Embodiment 1.

First, configuration of a data collection system according to Embodiment 1 of the present disclosure is described with reference to FIG. 1. FIG. 1 illustrates the configuration of the data collection system according to Embodiment 1. The data collection system includes multiple lower connection devices 100, communication devices 200, and an upper connection device 300 that are connected via a network. FIG. 1 illustrates a case in which communication devices 200A and 200B are connected to the upper connection device 300, lower connection devices 100a-100c are connected to the communication device 200A, and lower connection devices 100d-100f are connected to the communication device 200B. The communication device 200A acquires data from the lower connection devices 100a-100c. The communication device 200B acquires data from the lower connection devices 100d-100f.

Examples of such a data collection system include a factory automation (FA) system. The FA system includes, for example, (i) as the lower connection devices, sensors that detect data of a target object and output the data, (ii) slave devices as the communication devices, and (iii) a master device as the upper connection device.

With regard to communication protocols used in the data collection system, a communication protocol used for communication between the lower connection devices 100 and the communication devices 200 may be different from a communication protocol used for communication between the communication devices 200 and the upper connection device 300.

Next, the devices included in the data collection system are described.

The lower connection devices 100 output data to be acquired by the communication devices 200. This data includes output data that is data detected for the target object, and device information of the lower connection device 100.

The output data may be numerical values or character strings, and is transmitted to the communication devices 200 at regular communication periods. The communication periods of the lower connection devices 100 may be mutually different from each other. The device information is described later.

Next, the communication devices 200 are described. The communication devices 200 acquire the data from the lower connection devices 100, compile the data from the lower connection devices 100, and transmit to the upper connection device 300 the compiled data as transmission data. Further, the communication devices 200 acquire device information of the upper connection device 300 from the upper connection device 300. The communication devices 200 may further receive a control signal from the upper connection device 300. The communication devices 200 and the transmission data are described later in detail.

The upper connection device 300 communicates with the communication devices 200, to transmit the device information of the upper connection device 300 to the communication devices 200 and to acquire the transmission data from the communication devices 200. The upper connection device 300 may further save or analyze the transmission data, or transmit the control signal to the communication devices 200. In Embodiment 1, the upper connection device 300 communicates with the communication devices 200 at regular communication periods.

Figure 2:
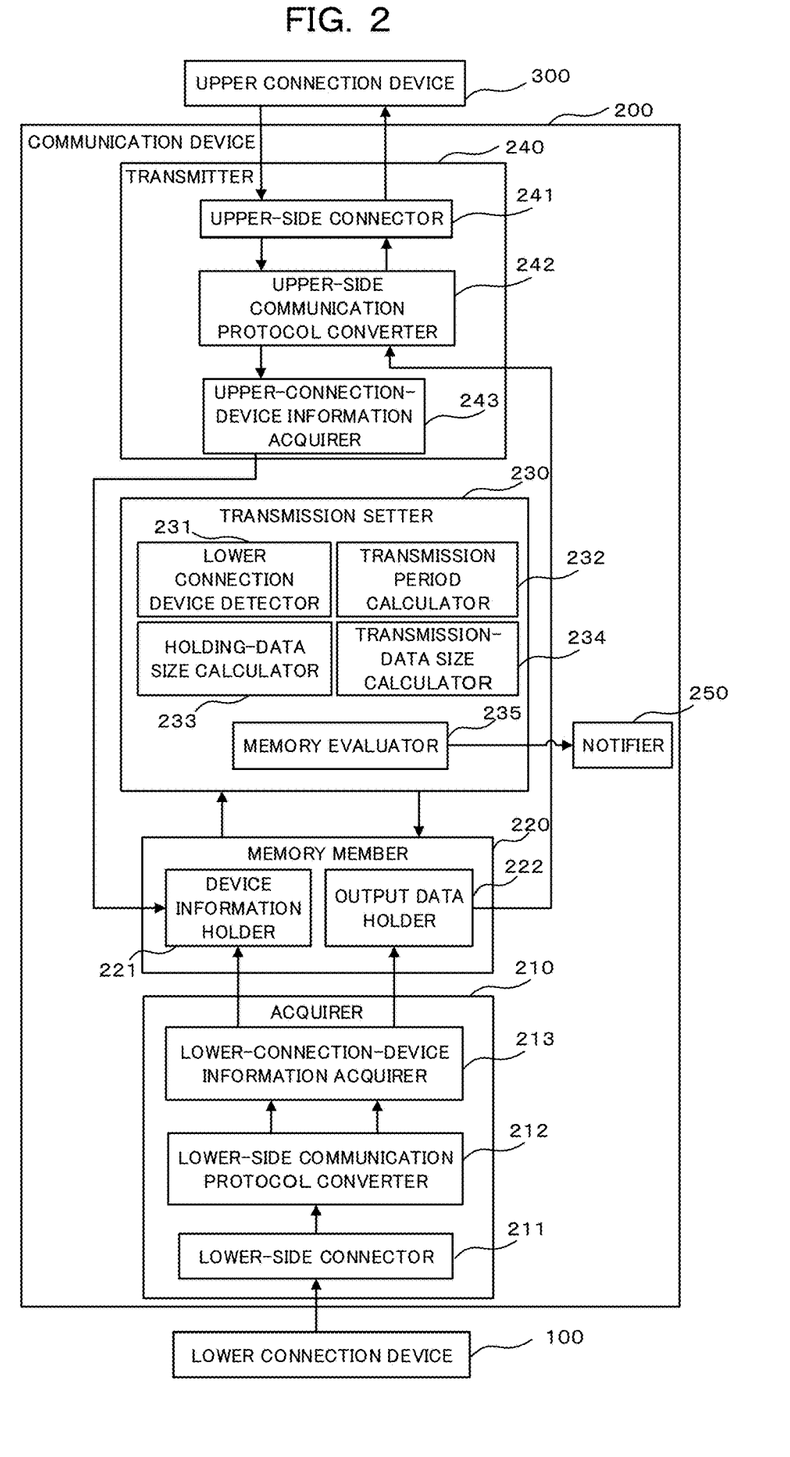
FIG. 2 is a functional block diagram of a communication device according to Embodiment 1.

Next, configuration of the communication devices 200 according to Embodiment 1 of the present disclosure is described in detail with reference to FIG. 2. FIG. 2 is a functional block diagram of each of the communication devices 200 according to Embodiment 1 of the present disclosure. FIG. 2 illustrates a part of the configuration of the data collection system that is illustrated in FIG. 1.

Each of the communication devices 200 includes an acquirer 210, a memory member 220, a transmission setter 230, a transmitter 240, and a notifier 250. Hereinafter, each of these functional elements is described in detail.

The acquirer 210 acquires the data from the lower connection devices 100. The acquirer 210 includes a lower-side connector 211, a lower-side communication protocol converter 212, and a lower-connection-device information acquirer 213.

The lower connection devices 100 are connected to the lower-side connector 211, to establish communication with the lower connection devices 100. The lower-side connector 211 includes, for example, a LAN port or a USB port.

The lower-side communication protocol converter 212 converts a communication protocol for the data of the lower connection devices 100 that is acquired by the lower-side connector 211. In a case in which this conversion of the communication protocol is unnecessary, the lower-side communication protocol converter 212 may be omitted.

The lower-connection-device information acquirer 213 acquires the device information of each of the lower connection devices 100. This device information is information of (i) the communication period with which the lower connection device 100 communicates and (ii) a data size of the output data from the lower connection device 100.

The communication periods may be acquired from the lower connection devices 100 as communication period information, may be acquired by measuring communication intervals at which the lower connection devices 100 communicate, or may be acquired, in a case of configuration in which the upper connection device 300 or the communication device 200 sets the communication periods of the lower connection devices 100 in advance, by acquiring the set communication periods from the upper connection device 300 or the communication device 200.

The data sizes of the output data are sizes of the output data transmitted from the lower connection devices 100 at every communication period and are each indicated by a unit such as a byte. The data sizes may be acquired from the lower connection devices 100 as data size information, may be acquired by measuring data sizes of the output data from the lower connection devices 100, or may be acquired, in a case of configuration in which the upper connection device 300 or the communication device 200 sets the data sizes of the lower connection devices 100 in advance, by acquiring the set data sizes.

In a case of configuration in which the transmission setter 230 can set a transmission period by using the communication periods of the lower connection devices 100, the lower-side communication protocol converter 212 and the lower-connection-device information acquirer 213 may be omitted from the acquirer 210.

The transmitter 240 communicates with the upper connection device 300, to transmit the transmission data obtained by compiling the data acquired from the lower connection devices 100. This element, although being named "transmitter 240" for expediency, may also receive information from the upper connection device 300. The transmitter 240 includes an upper-side connector 241, an upper-side communication protocol converter 242, and an upper-connection-device information acquirer 243.

The upper connection device 300 is connected to the upper-side connector 241, to establish communication with the upper connection device 300.

The upper-side communication protocol converter 242 converts communication protocols for the data from the upper connection device 300 that is acquired by the upper-side connector 241 and for the transmission data that is transmitted to the upper connection device 300. In a case in which this conversion of the communication protocols is unnecessary, the upper-side communication protocol converter 242 may be omitted. Further, the lower-side communication protocol converter 212 and the upper-side communication protocol converter 242 may be provided as a single element.

The upper-connection-device information acquirer 243 acquires the device information of the upper connection device 300. This device information is information of (i) the communication period with which the upper connection device 300 communicates and (ii) a data size of the transmission data that is receivable by the upper connection device 300.

The communication period may be acquired from the upper connection device 300 as communication period information, or may be acquired by measuring communication intervals at which the upper connection device 300 communicates. For example, in a case of configuration in which the upper connection device 300 transmits a specific frame at every period, the communication period can be calculated from time intervals at which the frame is received, or in a case of configuration in which the upper connection device 300 or the communication device 200 sets in advance the communication period of the upper connection device 300, the communication period may be acquired by acquiring the set communication period.

The data size of the transmission data that is receivable by the upper connection device 300 is a size of the transmission data that is transmittable to the upper connection device 300 at every transmission period and is indicated by a unit such as a byte. The data size is acquired from the upper connection device 300 as data size information, or may be acquired, in a case of configuration in which the upper connection device 300 or the communication device 200 sets in advance the data size of the transmission data that is receivable by the upper connection device 300, by acquiring the set data size.

In a case of configuration in which the transmission setter 230 can set the transmission period without using the device information of the upper connection device 300, the upper-connection-device information acquirer 243 may be omitted.

The memory member 220 holds the data acquired from the lower connection devices 100 and the data acquired from the upper connection device 300. The memory member 220 is, for example, a volatile memory that can hold data temporarily. The memory member 220 includes a device information holder 221 and an output data holder 222.

The device information holder 221 holds the device information acquired by the lower-connection-device information acquirer 213 and the device information acquired by the upper-connection-device information acquirer 243.

The device information holder 221 holds the device information so as to enable identification of the device information, that is, so as to enable identifying which one of the lower connection devices 100 or the upper connection device 300 the device information is about. For example, the device information holder 221 holds, in association with the device information, identification information for identification of a device. The identification information is, for example, an MAC address of a device that is acquired from the device that is one of the lower connection devices 100 or the upper connection device 300, or a device name that is set by the communication device 200 in advance. In a case of configuration in which the communication device 200 can achieve discrimination of the device information without using the identification information, the identification information is not necessarily used. For example, the identification information is unnecessary in a case in which the communication device 200 can acquire a port via which data is acquired and the acquired data while associating the port and the data.

Figure 3:
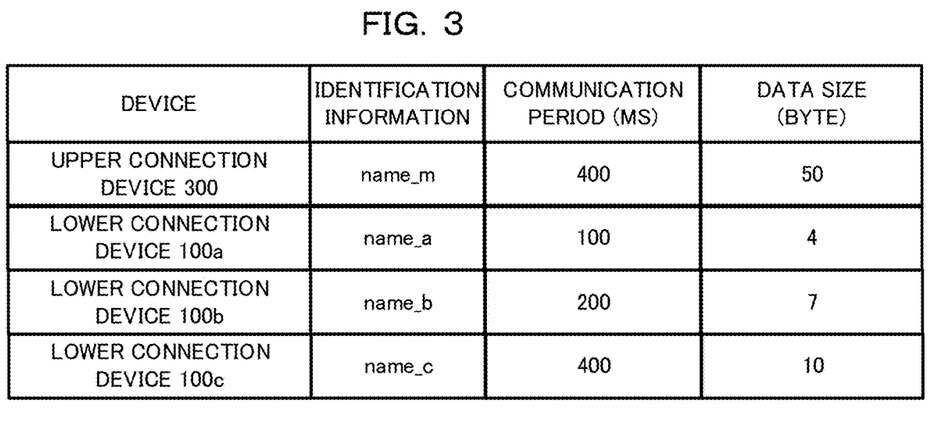
FIG. 3 illustrates device information that is held in a device information holder of the communication device according to Embodiment 1.

FIG. 3 illustrates an example of the device information that is held in the device information holder 221. FIG. 3 illustrates the device information that is held in the device information holder 221 of the communication device 200A. The device information holder 221 stores, for each of the lower connection devices 100a-100c, the identification information, the communication period (ms), and the data size of the output data (bytes) in association with one another, and stores, for the upper connection device 300, the identification information, the communication period (ms), and the data size of the transmission data that is receivable by the upper connection device 300 (bytes) in association with one another.

The output data holder 222 holds the output data acquired from the lower connection devices 100 at least until the data is transmitted to the upper connection device 300.

The memory member 220 may have any configuration that enables holding of the device information of each of the lower connection devices 100, the device information of the upper connection device 300, and the output data. Thus, the device information holder 221 and the output data holder 222 are not necessarily provided as separate elements.

The transmission setter 230, based on the device information held by the device information holder 221, performs setting relating to transmission of data to the upper connection device 300. The transmission setter 230, by using the communication periods of the lower connection devices, sets the transmission period that is a time interval in which the data acquired by the acquirer 210 is compiled and the compiled data is transmitted to the upper connection device 300 as transmission data. Setting may be performed for the output data of the lower connection devices 100 that is to be contained in the transmission data. The transmission setter 230 includes a lower connection device detector 231, a transmission period calculator 232, a holding-data size calculator 233, a transmission-data size calculator 234, and a memory evaluator 235.

The lower connection device detector 231 detects the lower connection devices 100 connected to the communication device 200 by referring to the device information of the lower connection devices 100 that is held by the device information holder 221, and detects, even after starting of data collection, whether the device information of each of the lower connection devices 100 that is held by the device information holder 221 is altered. This method can be used in a case of connecting the lower connection devices 100 and the communication device 200 via a network. The communication device 200 may detect disconnection (i) by regularly sending a request to send a reply as to whether each of the lower connection devices 100 is connected and (ii) based on whether a reply is sent in response to the request.

In a case in which the communication device 200 is connected to the lower connection devices 100 by using a point-to-point method, whether the lower connection devices 100 are connected via the lower-side connector 211 is determined based on whether a reply is sent in response to a command that is detectable by the lower connection devices 100 and is sent to each of all ports included in the communication device 200. After connection of the lower connection device 100 is detected for a port, a request for a reply may be sent to the port and disconnection may be detected based on whether a reply is sent. Further, regularly transmitting from the beginning to a port to which no connection is established a command requesting a reply enables detection of connection of a new lower connection device 100 by presence/absence of the reply.

The transmission period calculator 232 calculates the transmission period with which the communication device 200 compiles acquired data and transmits the compiled data as the transmission data to the upper connection device 300.

The transmission setter 230 sets, as the transmission period, the transmission period calculated by the transmission period calculator 232.

Hereinafter, a method for calculating the transmission period is described.

In a case in which the communication periods of all of the lower connection devices 100 are shorter than the communication period of the upper connection device 300, the transmission period is made to be equal to the communication period of the upper connection device 300, since the transmission period cannot be shorter than the communication period of the upper connection device 300.

Conversely, in a case in which the communication periods of the lower connection devices 100 are equal to or longer than the communication period of the upper connection device 300, the transmission period is made to be equal to a communication period of the lower connection device 100 that is the longest among the communication periods of the connected lower connection devices 100. This enables, within the transmission period, (i) acquiring from a lower connection device 100 corresponding to the longest communication period the output data corresponding to one communication period of this lower connection device 100 and (ii) transmitting the output data as the transmission data. This is because making the transmission period shorter than the communication period that is the longest among the communication periods of the lower connection devices 100 leads to repetitive transmission to the upper connection device 300 of the data of such lower connection device 100.

Although the transmission period is made to be equal to the communication period of the upper connection device 300 in the case in which the communication periods of all of the lower connection devices 100 are shorter than the communication period of the upper connection device 300, this case also applies to a case in which the transmission period is equal to or longer than the communication period that is the longest among the communication periods of the lower connection devices 100. Thus, the transmission period is made by the communication device 200 to be equal to or longer than the communication period that is the longest among the communication periods of the lower connection devices 100, resulting in avoidance of unnecessary repetitive transmission to the upper connection device 300 from the lower connection device 100 of the same data. This enables improvement in efficiency of communication between the upper connection device 300 and the communication device 200.

The transmission period may be set to be longer than the communication period of the upper connection device 300 if the memory evaluator 235 determines that there is no need for prompt transmission of the transmission data to the upper connection device 300 and thus the extension has no problem. Setting the transmission period to be longer reduces the frequency of transmission of data by the communication device 200 to the upper connection device 300, thereby enabling further improvement in efficiency of communication between the upper connection device 300 and the communication device 200.

Further, a least common multiple of the communication periods of all of the connected lower connection devices 100 is desirable as the transmission period. Hereinafter, reasons for employment of the least common multiple are described.

A number of data items that are contained in the output data from each lower connection device 100 and are to be contained in the transmission data is hereinafter referred to as the "data set number". In a case in which the transmission period is not a multiple of a communication period of one lower connection device of the lower connection devices 100, the value obtained by dividing the transmission period by the communication period of the one lower connection device is a non-integer.

Fixing the data set number of each of the lower connection devices 100 in the transmission data can be achieved by setting in advance by the transmission setter 230 the data set number for each of the lower connection devices 100 as a value that is an integer portion of a quotient of the transmission period divided by a communication period of a given lower connection device of the lower connection devices 100. This case, however, leads to an increase in a data size of the output data to be held in the output data holder 222.

In a case in which the transmission setter 230 does not set the data set number in the transmission data for each of the lower connection devices 100 and the data set number of each lower connection devices 100 is not fixed in the transmission data, the data set number corresponding to each of the lower connection devices 100 changes at every transmission period, and accordingly a data size of the transmission data also changes at every transmission period. A configuration in which the data size of the transmission data changes requires a size of the frame of the transmission data and a size of the output data holder 222 to be sizes that enable transmission of the transmission data with the maximum-conceivable data size. Failure in securing such sizes leads to a situation in which failure occurs in transmission of the transmission data with a large amount of the data set number or to a situation in which failure occurs in holding all of the output data to be held, thereby preventing acquisition of such. Thus, such configuration requires an increase in the size of the frame of the transmission data and an increase the size of the output data holder 222, although such use of increased sizes is temporary.

The increase in the data size of the output data to be held in the output data holder 222 or the increase in the size of the frame of the transmission data and the size of the output data holder 222 that are to be provided leads to an increase in the possibility that the memory evaluator 235 described later diagnoses the existence of a problem. When the memory evaluator 235 diagnoses the existence of a problem, the data collection system cannot start communication. This case requires changing system configuration, the data sizes, or the like, or requires preparing another higher-performance upper connection device 300 and another higher-performance communication device 200 in order to increase the size of the frame of the transmission data and the size of the output data holder 222 that are provided, resulting in an increase in cost of the system.

By employing the least common multiple of the communication periods of all of the lower connection devices 100 as the transmission period, the transmission period becomes a multiple with respect to all of the lower connection devices 100, and a value obtained by dividing the transmission period by any one of the communication periods of the lower connection devices becomes an integer. This (i) enables, since the data set numbers of the lower connection devices 100 do not change at every transmission period, fixing of the data size of the transmission data at every transmission period, resulting in a decrease in the possibility that the memory evaluator 235 diagnoses the existence of a problem and that communication cannot be started, or (ii) eliminates the need for preparing another higher-performance upper connection device 300 and another higher-performance communication device 200 in order to increase the size of the frame of the transmission data and the size of the output data holder 222 that are provided, enabling low-cost configuration of the system.

Further, the transmission period is made to be a multiple of the communication period of the upper connection device 300. This is because the communication device 200 can transmit the transmission data to the upper connection device 300 only at a timing that exists within the communication period of the upper connection device 300 and with which the communication device 200 can transmit data. The timing at which transmission of data can be performed is a time point that exists within the communication period and at which the communication device 200 is permitted to transmit data to the upper connection device 300.

In the case in which the device information as illustrated in FIG. 3 is employed in the data collection system, the communication period of the lower connection device 100c that is equal to or longer than the communication period of the upper connection device 300. Thus, the transmission period calculator 232 sets the transmission period as the communication period "400 milliseconds" of the lower connection device 100c.

In the aforementioned manner, the transmission period calculator 232 calculates the transmission period by using the communication periods of the lower connection devices 100 and the upper connection device 300.

The holding-data size calculator 233 calculates the data size of the data to be held by the output data holder 222. Hereinafter, a method for calculating the data size of the data to be held is described.

When the data size of the data to be held (hereinafter also referred to as the "holding-data size") is referred to as Dm, the transmission period is referred to as Ts, and the communication period of each of the lower connection devices 100 is referred to as Tr, and the size of the output data is referred to as Dr, the holding-data size of each of the lower connection devices 100 is calculated by using Formula 1 below.

$$Dm=Ts/Tr \times Dr \qquad \text{Formula 1}$$

Figure 4:
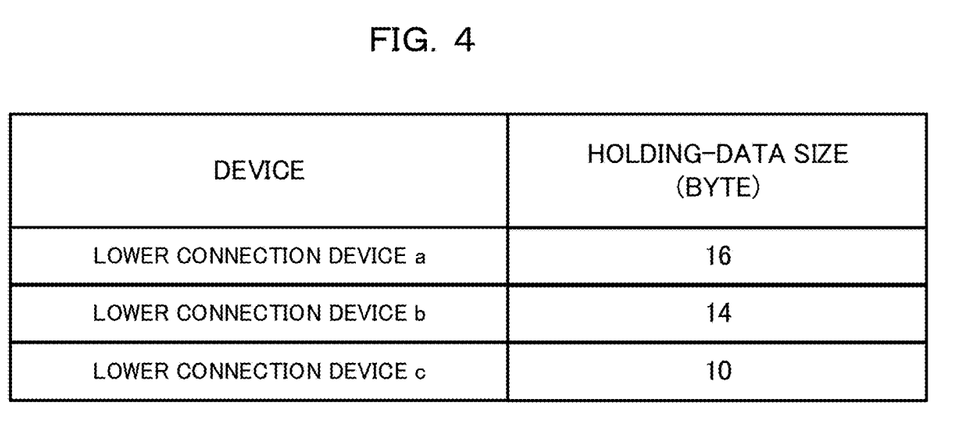
FIG. 4 illustrates holding-data sizes of lower connection devices that are calculated by a holding-data size calculator according to Embodiment 1.

As expressed in Formula 1, the holding-data size calculator 233 calculates, for each of the lower connection devices 100, as the holding-data size, the product of (i) quotient of the transmission period divided by a communication period of the lower connection device 100 and (ii) the data size of the output data from the lower connection device 100. FIG. 4 illustrates a result of calculation by the holding-data size calculator 233 of the holding-data size for each of the lower connection devices 100 in a case in which the devices communicate with the communication periods corresponding to the values illustrated in FIG. 3 and accordingly the transmission period is 400 milliseconds. FIG. 4 illustrates the holding-data sizes that are calculated for the lower connection devices 100. The data size of the data to be held is a sum of the holding-data sizes calculated for the lower connection devices 100. Thus, in a case in which the holding-data sizes for the lower connection devices 100 are the values as illustrated in FIG. 4, the data size of the data to be held is 40 bytes.

The transmission-data size calculator 234 calculates the data size of the data for transmission from the transmitter 240 to the upper connection device 300. Hereinafter, a method for calculating the data size of the data for transmission from the transmitter 240 to the upper connection device 300 is described.

Figure 7:
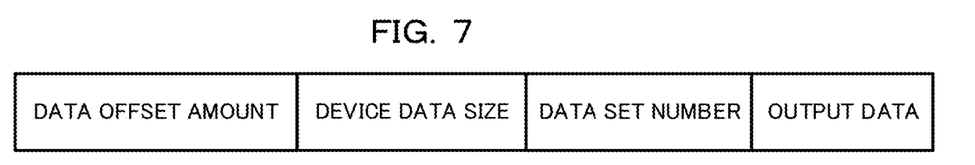
FIG. 7 is a view of a frame of transmission data according to Embodiment 1.

The transmission data contains, for each of the lower connection devices 100, additional information such as a data offset amount, a device data size, and the data set number, in addition to the output data.

Accordingly, a size of the transmission data (hereinafter also referred to as the "transmission-data size) is larger in volume than the holding-data size by a data size of the additional information. When the transmission-data size is referred to as Ds and the data size of the additional information is referred to as De, the transmission-data size of each of the lower connection devices 100 is calculated by using Formula 2 below.

$$Ds=Dm+De \qquad \text{Formula 2}$$

The data offset amount indicates a location, within the frame of the transmission data, at which the output data of a corresponding lower connection device 100 is contained. The device data size indicates the value of the output data from a corresponding lower connection device 100. The data set number is a number of data items of a corresponding lower connection device 100 that are to be contained in the transmission data for transmission by the communication device 200 to the upper connection device 300 at every one period. The data set number is made to be quotient of the transmission period divided by the communication period and to be an integer. The data set number calculated by the transmission-data size calculator 234 is also used by the transmission setter 230 to set the transmission data.

Figure 5:
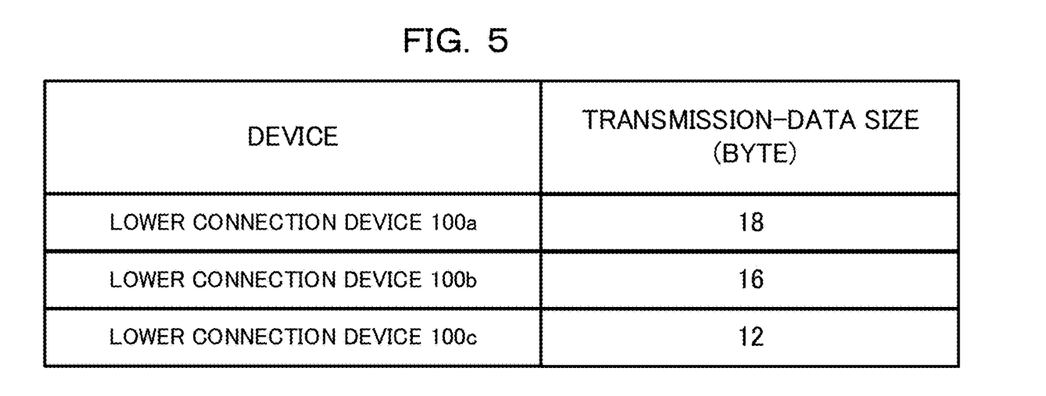
FIG. 5 illustrates transmission-data sizes of the lower connection devices that are calculated by a transmission-data size calculator according to Embodiment 1.

FIG. 5 illustrates a result of calculation by the transmission-data size calculator 234 of the transmission-data size for each of the lower connection devices 100 in a case in which the holding-data sizes are the values illustrated in FIG. 4 and the data size of the additional information is always two bytes for each of the lower connection devices 100. FIG. 5 illustrates the transmission-data sizes that are calculated for the lower connection devices 100. The data size of the transmission data is a sum of the transmission-data sizes calculated for the lower connection devices 100. Thus, in a case in which the transmission-data sizes for the lower connection devices 100 are the values as illustrated in FIG. 5, the data size of the transmission data is 46 bytes.

The memory evaluator 235 diagnoses whether the data sizes calculated by the holding-data size calculator 233 and the transmission-data size calculator 234 have a problem. Hereinafter, a method for diagnosing performed by the memory evaluator 235 is described.

With regard to the holding-data size, diagnosing is performed as to whether a sum of the holding-data sizes for each of the lower connection devices 100 exceeds a data size that is holdable by the output data holder 222. With regard to the transmission-data size, diagnosing is performed as to whether a sum of the transmission-data sizes for each of the lower connection devices 100 exceeds a data size that is holdable by the upper connection device 300. For example, in a case in which the holding-data sizes of the lower connection devices are the data sizes as illustrated in FIG. 3, the sum of the holding-data size is 40 bytes. In this case, when the data size holdable by the output data holder 222 is equal to or larger than 40 bytes, a determination is made that there is no problem. Similarly, in a case in which the transmission-data sizes of the lower connection devices are the data sizes as illustrated in FIG. 4, the sum of the transmission-data size is 46 bytes. In this case, when the data size holdable by the upper connection device 300 is equal to or larger than 46 bytes, a determination is made that there is no problem. When the data size holdable by the upper connection device 300 is 50 bytes as illustrated in FIG. 3, the sum of the transmission-data size being "46 bytes" is non-problematic.

When the memory evaluator 235 diagnoses that the transmission period calculated by the transmission period calculator 232 does not have a problem, the calculated value is set as the transmission period. The transmission period may be set to a longer time interval, as long as the holding-data size or the transmission-data size does not exceed the respective permitted data size.

The holding-data size calculator 233, the transmission-data size calculator 234, and the memory evaluator 235 may be omitted when there is no necessity for diagnosing as to whether the holding-data size or the transmission-data size exceeds the permitted data size.

The notifier 250 sends notification when the memory evaluator 235 diagnoses that the data sizes calculated by the holding-data size calculator 233 and the transmission-data size calculator 234 have a problem and no value is settable as the transmission period. This notification may be sent visually by a display, a miniature bulb, or the like, or may be sent by audio of a buzzer or a voice utterance "an error has occurred". The notifier 250 may, by sending notification of an error to the upper connection device 300 via the upper-side connector 241, prompt a user to a change system setting or system configuration. The notifier 250 may be omitted when notification is unnecessary.

Although FIG. 2 illustrates a functional block diagram of each of the communication devices 200 according to Embodiment 1, improvement in efficiency of communication between the upper connection device 300 and the communication device 200 can be achieved by inclusion of an acquirer 210 that acquires data from multiple lower connection devices 100, a transmission setter 230 that sets the transmission period to be equal to or longer than a communication period that is the longest among communication periods of the multiple lower connection devices 100, and a transmitter 240 that transmits the transmission data to the upper connection device 300 with the transmission period that is set by the transmission setter 230.

Furthermore, the upper connection device 300, although described in Embodiment 1 as a device connected to the communication devices 200, may be a server on a network, as long as the transmission data from the communication devices 200 can be received. Furthermore, the lower connection devices 100, although described as devices connected to ports or the like of the communication devices 200, may have a configuration that can perform wireless network communication. Furthermore, each of the lower connection devices 100, although illustrated in FIG. 1 as an element connected to one communication device 200, may be connected to multiple communication devices 200.

Figure 6:
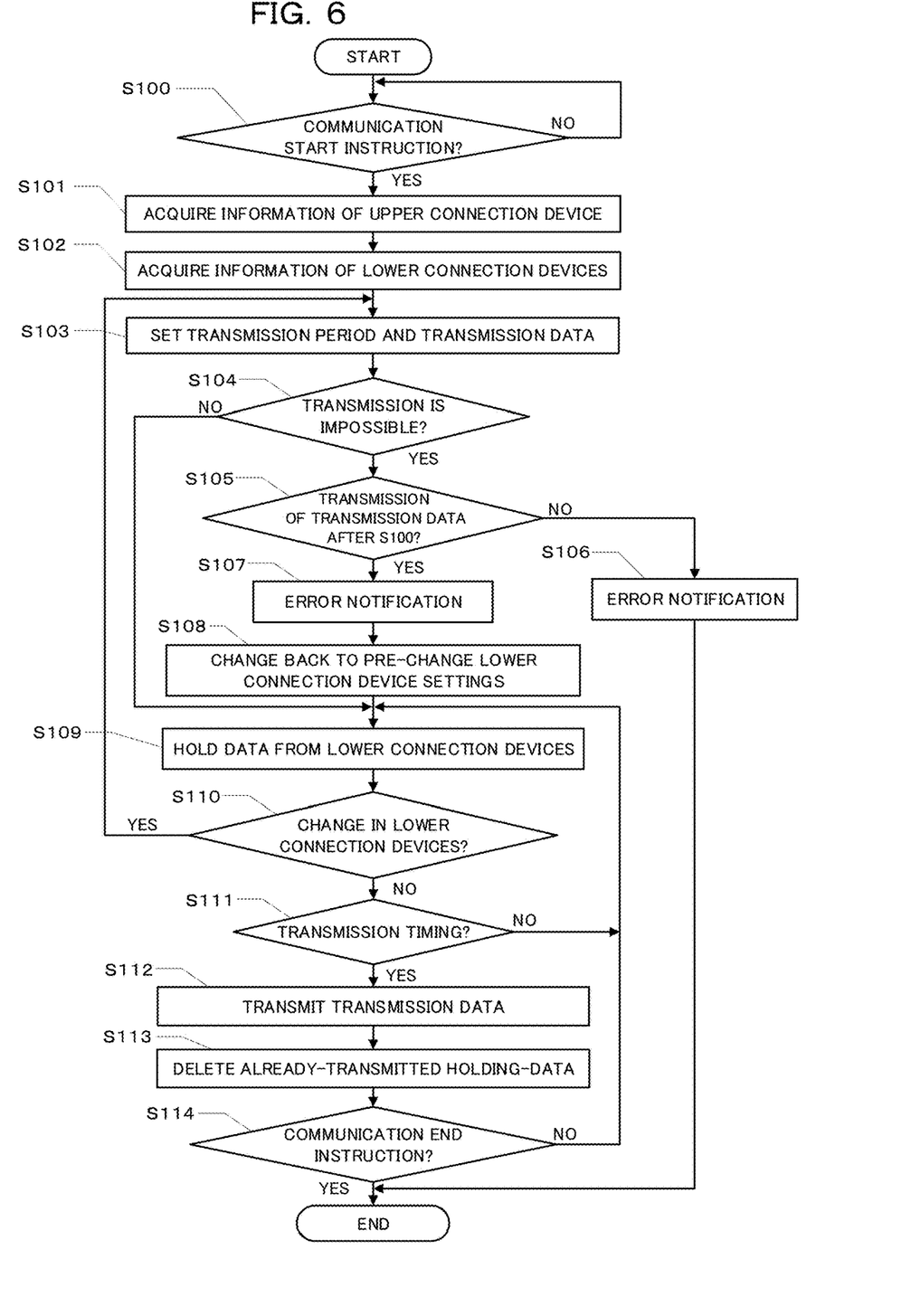
FIG. 6 is a flowchart illustrating an operation of the communication device according to Embodiment 1.

Hereinafter, an operation of each of the communication devices 200 according to Embodiment 1 of the present disclosure is described with reference to FIG. 6. FIG. 6 is a flowchart illustrating an operation of the communication device 200 according to Embodiment 1 of the present disclosure.

The flow illustrated in FIG. 6 starts upon startup of the communication device 200. First, in step S100, the upper-connection-device information acquirer 243 determines whether a communication start instruction is received from the upper connection device 300. Step S100 is repeated until the communication start instruction is received.

Upon receipt of the communication start instruction, the process flow proceeds to step S101, and the upper-connection-device information acquirer 243 acquires the information of the upper connection device 300. The information of the upper connection device 300 is information of (i) the communication period of the upper connection device 300 and (ii) the data size of the transmission data that is receivable by the upper connection device 300. The device information holder 221 holds the acquired information of the upper connection device 300.

After step S101, the process flow proceeds to step S102, and the lower-connection-device information acquirer 213 acquires the information of the lower connection devices 100. The information of the lower connection devices 100 is information of (i) the communication periods of the lower connection devices 100 and (ii) the data sizes of the output data from the lower connection device 100. The device information holder 221 holds the acquired information of the lower connection devices 100.

After step S102, the process flow proceeds to step S103, and the transmission setter 230 sets the transmission data and the transmission period of the transmission data.

In step S103, in order to set the transmission period, the lower connection device detector 231 firstly detects whether the lower connection devices 100 are connected or disconnected, and then the transmission period calculator 232 calculates the transmission period. First, the communication period of the upper connection device 300 and the communication period of the connected lower connection devices 100 are acquired, and then the transmission period calculator 232 calculates the transmission period.

Setting the transmission data includes setting, for each of the lower connection devices 100, the data set number of the data items contained in the data of the lower connection device 100 that are to be contained in the transmission data, an order of the data of the lower connection device 100 in the frame of the transmission data, and the like. FIG. 7 is a view of the frame of the transmission data. As illustrated in FIG. 7, the transmission data contains the data offset amounts, the device data sizes, information of the data set numbers, and the output data from the lower connection devices 100. Any format that allows the upper connection device 300 to achieve frame-content identification may be employed as the frame of the transmission data, such as a format in which, for each of the lower connection devices 100, the additional information illustrated in FIG. 7 and the output data that are generated for the lower connection device 100 are linked to one another, or a format in which each additional information contains information about all of the lower connection devices 100.

Thereafter, the holding-data size calculator 233 calculates the data size of the data to be held by the output data holder 222, and then the transmission-data size calculator 234 calculates the data size of the data for transmission from the transmitter 240 to the upper connection device 300.

After the transmission period and the transmission data are set in step S103, the flow proceeds to step S104, and the memory evaluator 235 diagnoses whether the data sizes calculated by the holding-data size calculator 233 and the transmission-data size calculator 234 have a problem. Diagnosing is performed for each of the holding-data size and the transmission-data size, similarly to the processes for calculation of the transmission period. When any one of or both the holding-data size and the transmission-data size exceed the permitted data sizes, the process flow proceeds to step S105. In step S105, a determination is made on whether the transmission data is previously transmitted after the receipt of the communication start instruction in step S100. When the transmission data is not previously transmitted even once, the process flow proceeds to step S106 to send error notification from the notifier 250.

When the transmission data has been transmitted once or more, the process flow proceeds from step S105 to step S107. The process flow proceeds to step S107 when changing occurs in the lower connection devices 100 connected to the communication device 200 after the starting of communication, for example, (i) when one lower connection device of the lower connection devices 100 connected to the communication device 200 is replaced with another lower connection device 100, (ii) when another lower connection device 100 is newly connected, or (iii) when one lower connection device of the lower connection devices 100 is disconnected. In step S107, the error notification is sent from the notifier 250.

After step S107, the process flow proceeds to step S108, and the settings of the transmission period and the transmission data are changed back to those before the changing in the lower connection devices 100 occurs, thereby continuing, with respect to the lower connection devices 100 for which acquisition of data can be performed normally so far, acquisition of data and transmission of the data to the upper connection device 300. The inclusion of step S108 enables, even upon occurrence of an error due to connection or disconnection of a lower connection device 100, continuation of communication of data collected so far.

After step S108 or when the memory evaluator 235 diagnoses in step S104 that no problem occurs, the process flow proceeds to step S109 in order to start holding of data from the lower connection devices. In step S109, the output data holder 222 holds the output data from the lower connection devices 100.

After step S109, the process flow proceeds to step S110, and the lower connection device detector 231 determines whether changing occurs in the lower connection devices 100. The determination in step S110 is not necessarily made after step S109 and may be made at predetermined time intervals.

When the lower connection device detector 231 detects changing in the lower connection devices in step S110, the process flow returns to step S103 and the transmission setter 230 again sets the transmission period and the transmission data.

According to the present disclosure, the communication device 200 sets the transmission period, contrary to the data collection system of Patent Literature 1 in which the upper connection device 300 sets the transmission period. This configuration enables detecting, in step S110, connection or disconnection of a lower connection device 100.

When the determination that changing occurs in the lower connection devices is not made in step S110, the process flow proceeds to step S111. In step S111, a determination is made on whether the current time is a transmission time. The transmission time is a time point at which (i) a time period corresponding to the transmission period is elapsed after starting the holding of the output data from the lower connection device 100 and (ii) the transmission data is to be transmitted. When the current time is not the transmission time, the process flow returns to step S109, to continue the holding of data from the lower connection devices 100.

When a determination is made in step S111 that the current time is the transmission time, the process flow proceeds to step S112 and the transmission data is transmitted from the transmitter 240.

After step S112, the process flow proceeds to step S113, and the output data that is previously held by the output data holder 222 and is previously transmitted is deleted from the output data holder 222.

After step S113, the process flow proceeds to step S114, and a determination is made on whether a communication end instruction is previously received from the upper connection device 300. When the communication end instruction is previously received, the flow illustrated in FIG. 6 ends, leading to stoppage of communication. When the communication end instruction is not previously received, the process flow returns to step S109, to continue the holding of data from the lower connection devices 100. The determination in step S114 is not necessarily made after step S113 and may be made at predetermined time intervals.

Due to the operation of the communication device 200 as described above, the transmission period that is a time interval in which the communication device 200 compiles data and transmits the compiled data to the upper connection device 300 as transmission data is set to be equal to or longer than a communication period that is the longest among communication periods of the multiple lower connection devices 100. This enables reduction in a number of transmissions of data per unit time from the communication device 200 to the upper connection device 300, thereby enabling improvement in efficiency of communication between the upper connection device 300 and the communication device 200.

Although Embodiment 1 describes a case in which the communication device 200 operates as per the flowchart illustrated in FIG. 6, transmitting the transmission data to the upper connection device 300 with a transmission period that is equal to or longer than a communication period that is the longest among communication periods of the multiple lower connection devices 100 can produce the effect of improving efficiency in communication between the upper connection device 300 and the communication device 200 according to the present disclosure. Thus, the communication device 200 has only to perform the operations in step S102, step S103, step S109, step S111, and step S112, and performance of operations other than the operations in the aforementioned steps may be omitted.

Figure 8:
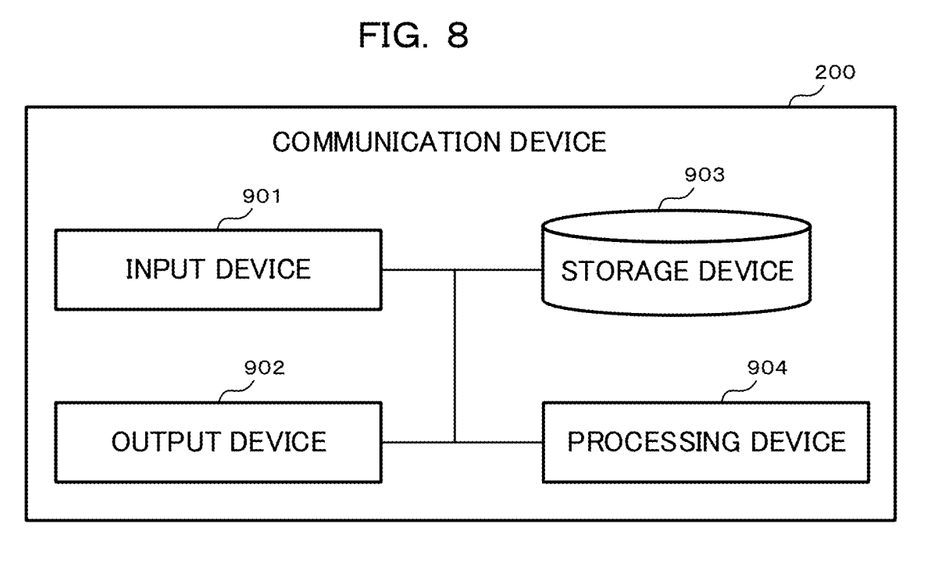
FIG. 8 illustrates hardware configuration of the communication device according to Embodiment 1.

Hereinafter, hardware configuration of each of the communication devices 200 according to Embodiment 1 is described with reference to FIG. 8. FIG. 8 illustrates hardware configuration of the communication device 200 according to Embodiment 1. The communication device 200 includes an input device 901, an output device 902, a storage device 903, and a processing device 904.

The input device 901 is an interface that is included in the acquirer 210 and the transmitter 240 of the communication device 200 and to which information is inputted. This network may be a wired communication network using a cable such as a LAN cable or coaxial cable, or may be a wireless communication network using wireless communication technology.

The output device 902 is included in the transmitter 240 of the communication device 200. The output device 902 is a control signal or an interface. This network may be a wired communication network using a cable such as a LAN cable or coaxial cable, or may be a wireless communication network using wireless communication technology.

The storage device 903 is included in the memory member 220 of the communication device 200 and is a device that serves as a working memory or the like, such as a non-volatile or volatile semiconductor memory such as RAM, ROM, and a flash memory, a magnetic disk, a flexible disk, an optical disk, or a compact disc.

The processing device 904 is included in the transmission setter 230 of the communication device 200. The processing device 904 may be dedicated hardware, or may be a central processing unit (CPU) for executing a program stored in the storage device 903.

In a case in which the processing device 904 is dedicated hardware, the processing device 904 is, for example, a single circuit, a combined circuit, a programmed processor, a parallel-programmed processor, an ASIC, an FPGA, or a combination thereof.

In a case in which the processing device 904 is a CPU, the functions of the transmission setter 230 are achieved by software, firmware, or a combination of software and firmware. Such software and firmware are each described as a program and stored in the storage device 903. The processing device 904 reads out the program stored in the storage device 903 and executes the program, thereby achieving functions of each element.

The functions of the transmission setter 230 may be achieved by implementing a part of the functions by hardware and implementing another part of the functions by software or firmware.

As described above, the processing device 904 enables achievement of each of the aforementioned functions by hardware, software, firmware, or combinations thereof.

As described above, according to the communication device and the data collection system according to the present disclosure, the transmission period with which the communication device compiles data acquired from the lower connection devices and transmits the compiled data to the upper connection device is set to be equal to or longer than a communication period that is the longest among communication periods of the multiple lower connection devices. This enables reduction in a number of transmissions of data per unit time from the communication device to the upper connection device and leads to avoidance of unnecessary repetitive transmission to the upper connection device of the same data, thereby enabling improvement in efficiency of communication between the upper connection device and the communication device.

REFERENCE SIGNS LIST

100 Lower connection device
200 Communication device
210 Acquirer
211 Lower-side connector
212 Lower-side communication protocol converter
213 Lower-connection-device information acquirer
220 Memory member
221 Device information holder
222 Output data holder
230 Transmission setter
231 Lower connection device detector
232 Transmission period calculator
233 Holding-data size calculator
234 Transmission-data size calculator
235 Memory evaluator
240 Transmitter
241 Upper-side connector
242 Upper-side communication protocol converter
243 Upper-connection-device information acquirer
250 Notifier
300 Upper connection device
901 Input device
902 Output device
903 Storage device
904 Processing device

The invention claimed is:
1. A communication device comprising:
an acquirer to acquire data from lower connection devices;

a transmission setter to set a transmission period to be equal to or longer than a communication period that is longest among communication periods of the lower connection devices, the transmission period being a time interval in which the data acquired by the acquirer from the lower connection devices is compiled and the compiled data is transmitted to an upper connection device as transmission data; and a transmitter to transmit the transmission data to the upper connection device with the transmission period that is set by the transmission setter, wherein the transmission setter sets, for each of the lower connection devices, based on the transmission period and a communication period of the lower connection device, a data set number that is a number of data items of the lower connection device that are to be contained in the transmission data, and the transmission setter sets the data set number for each of the lower connection devices as a value that is an integer portion of a quotient of the transmission period divided by the communication period of the lower connection device.

2. The communication device according to claim 1, wherein the transmission setter includes a transmission period calculator to calculate the transmission period by using the communication periods of the lower connection devices and a communication period of the upper connection device.

3. The communication device according to claim 2, further comprising:

a memory member to hold the data acquired by the acquirer, wherein the transmission setter further includes a holding-data size calculator to calculate, by using the transmission period calculated by the transmission period calculator, for each of the lower connection devices, a holding-data size that is a size of data to be held in the memory member, and a memory evaluator to diagnose whether a sum of the holding-data sizes calculated by the holding-data size calculator is equal to or smaller than a data size that is holdable by the memory member.

4. The communication device according to claim 3, wherein the transmission setter further includes a transmission-data size calculator to calculate, by using the transmission period calculated by the transmission period calculator, a transmission-data size that is a data size of the transmission data for transmission to the upper connection device, and the memory evaluator further diagnoses whether the transmission-data size calculated by the transmission-data size calculator is equal to or smaller than a data size of the transmission data that is receivable by the upper connection device.

5. The communication device according to claim 2, wherein the transmission period calculator calculates, as the transmission period, a least common multiple of the communication periods of the lower connection devices.

6. The communication device according to claim 1, wherein the transmission setter includes a lower connection device detector to detect whether the lower connection devices are connected or disconnected, and when the lower connection device detector detects changing in the lower connection devices, the transmission setter resets the transmission period.

7. A data collection system comprising:

the communication device according to claim 1;

the lower connection devices to output data to the communication device; and the upper connection device to acquire the transmission data from the communication device.

\* \* \* \* \*